(12) United States Patent
Jin et al.

(10) Patent No.: US 12,060,503 B2
(45) Date of Patent: Aug. 13, 2024

(54) ADHESIVE AND APPLICATION THEREOF

(71) Applicant: Covestro Intellectual Property GmbH & Co. KG, Leverkusen (DE)

(72) Inventors: Chen Jin, Guangdong (CN); Yingdan Zhu, Shanghai (CN); Songli Wei, Shanghai (CN); Qinglin Song, Shanghai (CN); Chenxi Zhang, Shanghai (CN); Evgeny Avtomonov, Leverkusen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 728 days.

(21) Appl. No.: 17/265,270

(22) PCT Filed: Aug. 15, 2019

(86) PCT No.: PCT/EP2019/071969
§ 371 (c)(1),
(2) Date: Feb. 2, 2021

(87) PCT Pub. No.: WO2020/035573
PCT Pub. Date: Feb. 20, 2020

(65) Prior Publication Data
US 2021/0317350 A1    Oct. 14, 2021

(30) Foreign Application Priority Data

Aug. 15, 2018  (CN) .......................... 201810932991.5
Sep. 27, 2018  (EP) ..................................... 18197364

(51) Int. Cl.
*C09J 175/06* (2006.01)
*C09J 5/06* (2006.01)
*C09J 11/08* (2006.01)

(52) U.S. Cl.
CPC .............. *C09J 175/06* (2013.01); *C09J 5/06* (2013.01); *C09J 11/08* (2013.01)

(58) Field of Classification Search
None
See application file for complete search history.

(56) References Cited

U.S. PATENT DOCUMENTS 4,870,129 A    9/1989  Henning et al.
5,177,141 A    1/1993  Thoma et al.
(Continued)

FOREIGN PATENT DOCUMENTS

CA    2412099 C    *  3/2011
CA    2588444 A1   * 11/2011
(Continued)

OTHER PUBLICATIONS

1-page brochure for STABAXOL P 200 at atamanchemicals.com, Downloaded on Jan. 25, 2024.*
(Continued)

*Primary Examiner* — Tae H Yoon
(74) *Attorney, Agent, or Firm* — The Webb Law Firm (57) ABSTRACT

The present invention relates to an adhesive and application thereof, and a bonded product obtained by using the adhesive. The adhesive comprises: a. at least one aqueous polyurethane dispersion; b. at least one surface passivated polyisocyanate; c. at least one polycarbodiimide having a weight-average molecular weight of 500 to 100,000; and d. optionally a carbodiimide having a carbodiimide group functionality of 1. The coating formed by the adhesive provided according to the present invention has good hydrolysis resistance.

14 Claims, 1 Drawing Sheet

(56) References Cited

U.S. PATENT DOCUMENTS

| | | |
|---|---|---|
| 6,348,548 B1 | 2/2002 | Abend |
| 8,772,387 B2 | 7/2014 | Laufer et al. |
| 2011/0244228 A1 | 10/2011 | Blum et al. |
| 2019/0010272 A1 | 1/2019 | Jin et al. |

FOREIGN PATENT DOCUMENTS

| | | | |
|---|---|---|---|
| CN | 103221229 A | * | 7/2013 |
| DE | 102009049630 A1 | * | 4/2011 |
| JP | 2004204333 A | * | 7/2004 |
| WO | 2017115804 A1 | | 7/2017 |

OTHER PUBLICATIONS

International Search Report for related Application No. PCT/EP2019/071969, mailed Sep. 4, 2019, 4 pages.

* cited by examiner

ADHESIVE AND APPLICATION THEREOF

CROSS-REFERENCE TO RELATED APPLICATION

This application is a national stage application under 35 U.S.C. § 371 of PCT/EP2019/071969, filed Aug. 15, 2019, which claims the benefit of European Application No. 18197364.5, filed Sep. 27, 2018, and Chinese Application No. 201810932991.5, filed Aug. 15, 2018, each of which is incorporated herein by reference.

TECHNICAL FIELD

The present invention relates to an adhesive and application thereof, and a bonded product obtained by using the adhesive.

BACKGROUND

Aqueous polyurethane dispersions can be widely used in the field of coatings and adhesives. In the field of adhesives, aqueous polyurethane dispersions are typically applied to a substrate surface, and then heated to remove water from the dispersion through evaporation, followed by heat activation (e.g., infrared heating) of the dispersion, and the substrate surface to which the dispersion is applied is finally contacted with an additional substrate surface to obtain a bonded product.

If the bonded portion of a product has poor hydrolysis resistance, it is easily degummed in the case of high temperature and high humidity. Therefore, the hydrolysis resistance of the product directly affects its storage, transportation and use environment.

Generally, the hydrolysis resistance of a coating formed by an adhesive is improved by increasing the cross-linking of the adhesive in the industry.

U.S. Pat. No. 4,870,129A discloses an adhesive comprising an isocyanate group-containing crosslinker and a hydroxyl-containing aqueous polyurethane dispersion, wherein the crosslinker increases the cross-linking of the adhesive and thereby improves the hydrolysis resistance of the coating formed therefrom. However, it has a disadvantage that the adhesive only has a short operating time, usually a few hours, which makes it unsuitable for industrial use.

U.S. Pat. No. 6,348,548 discloses the use of an aqueous dispersion comprising at least one solid surface passivated polyisocyanate and at least one isocyanate-reactive polymer for producing a potentially active layer or powder having a storage stability. A disadvantage of this application is that it requires a high operating temperature when applying said components to a substrate surface and then drying and activating it. Thus, it is not suitable for bonding substrates which are not resistant to a high temperature.

Both US2011/0244228 and CN106916273 disclose an aqueous polyurethane dispersion comprising terminal and pendant carboxyl groups. The aqueous polyurethane dispersion can be crosslinked with carbodiimide to increase the heat resistance of the coating formed by the aqueous polyurethane dispersion.

Therefore, it is desirable to develop an adhesive which forms a coating having good hydrolysis resistance.

SUMMARY OF THE INVENTION

It is an object of the present invention to provide an adhesive and application thereof, and a bonded product obtained by using the adhesive.

The adhesive according to the present invention comprises:
a. at least one aqueous polyurethane dispersion;
b. at least one surface passivated polyisocyanate;
c. at least one polycarbodiimide having a weight-average molecular weight of 500 to 100,000; and
d. optionally a carbodiimide having a carbodiimide group functionality of 1.

According to one aspect of the invention, there is provided the use of an adhesive provided according to the present invention for producing a bonded product.

According to another aspect of the invention, there is provided a method for producing a bonded product comprising the steps of:
i. applying an adhesive provided according to the present invention to at least one surface of a substrate;
ii. heating and drying the substrate surface to which the adhesive is applied; and
iii. contacting the substrate surface treated in step ii with a surface of the substrate itself or an additional substrate to obtain the bonded product.

According to still another aspect of the invention, there is provided a bonded product produced according to a method provided by the present invention.

The coating formed by the adhesive according to the present invention has good hydrolysis resistance.

DETAILED DESCRIPTION

The present invention provides an adhesive comprising: a. at least one aqueous polyurethane dispersion; b. at least one surface passivated polyisocyanate; c. at least one polycarbodiimide having a weight-average molecular weight of 500 to 100,000; and d. optionally a carbodiimide having a carbodiimide group functionality of 1. The present invention also provides the application of the adhesive, and a bonded product obtained by using the adhesive.

Adhesive

The term "aqueous polyurethane dispersion" is, as used herein, synonymous with aqueous polyurethaneurea dispersions and/or aqueous polyurethane polyurea dispersions and/or aqueous polyurea dispersions.

The term "adhesive" refers to a composition capable of bonding an object itself or one object to another object, and is used herein as a synonym for tackiness agents and/or sealants and/or binders. The adhesive has a solid content of preferably 10 wt % to 90 wt %, based on the total weight of the adhesive.

Aqueous Polyurethane Dispersion

The aqueous polyurethane dispersion may be added in the form of a dispersion, or in the form of a solid polyurethane polymer and water added separately and then mixed; most preferably directly in the form of a dispersion.

The aqueous polyurethane dispersion has a solid component in an amount of preferably 70 wt % to 99.98 wt %, based on the total weight of solid components of the adhesive.

The aqueous polyurethane dispersion has an acid value of preferably 0.5 mg KOH/g to 10 mg KOH/g, most preferably 0.5 mg KOH/g to 5 mg KOH/g.

The solid component of the aqueous polyurethane dispersion has a melting enthalpy of preferably more than 3 J/g, most preferably 20 J/g to 100 J/g at 20 to 100° C., based on the first heating curve measured by DSC at a heating rate of 20 K/min according to DIN 65467.

The residual content of the organic solvent in the aqueous polyurethane dispersion is less than 1.0 wt %, based on the total weight of the aqueous polyurethane dispersion.

The aqueous polyurethane dispersion has a solid content of preferably 10 wt % to 70 wt %, further preferably 50 wt % to 65 wt %, and most preferably 50 wt % to 60 wt %, based on the total weight of the aqueous polyurethane dispersion.

The aqueous polyurethane dispersion is preferably an anionic and/or nonionic aqueous polyurethane dispersion, most preferably an anionic aqueous polyurethane dispersion.

The anionic aqueous polyurethane dispersion contains a small amount of hydrophilic anionic groups. The amount of the hydrophilic anionic groups is preferably 0.1 meq/100 g of solid polyurethane to 15 meq/100 g of solid polyurethane, most preferably 1.6 meq/100 g of solid polyurethane to 14 meq/100 g of solid polyurethane.

The aqueous polyurethane dispersion is preferably obtained by the following steps:
  step I): preparing an isocyanate-functional prepolymer by a reaction comprising the following components:
  Ia) at least one polyisocyanate,
  Ib) at least one polymer polyol having a number-average molecular weight of preferably 400 g/mol to 8000 g/mol, further preferably 400 g/mol to 6000 g/mol, most preferably 600 g/mol to 3000 g/mol, and a hydroxyl functionality of preferably 1.5 to 6, further preferably 1.8 to 3, most preferably 1.9 to 2.1,
  Ic) optionally a hydroxy-functional compound having a molecular weight of 32 g/mol to 400 g/mol, and
  Id) optionally an isocyanate-reactive anionic hydrophilic agent or potential anionic hydrophilic agent;
  step II): reacting all or part of the free isocyanate groups (NCO) of the isocyanate-functional prepolymer with the following substance(s) for chain growth:
  IIa) at least one amino-functional compound having a molecular weight of 32 g/mol to 400 g/mol, and/or
  IIb) at least one isocyanate-reactive, preferably amino-functional, anionic hydrophilic agent or potential anionic hydrophilic agent;
wherein the resulting isocyanate-functional prepolymer is dispersed in water before, during or after step II), wherein any potential anionic groups present are converted to an ionic form by partial or complete reaction with a neutralizing agent, preferably after step II).

The solvent still present in the aqueous polyurethane dispersion after dispersion can be removed by distillation. The solvent can also be removed during the dispersion process.

In a preferred embodiment of the preparation of the aqueous polyurethane dispersion, components Ia) to Id) and IIa) to IIb) are used in the following amounts, wherein the sum of the respective amounts is always 100 wt %:
  5 wt % to 40 wt % of component Ia),
  55 wt % to 90 wt % of component Ib),
  0.5 wt % to 20 wt % of components Ic) and IIa),
  0.1 wt % to 25 wt % of components Id) and IIb), wherein 0.1 wt % to 5 wt % of the anionic hydrophilic agent or potential anionic hydrophilic agent from Id) and/or IIb) is used, based on the total weight of components Ia) to Id) and IIa) to IIb).

In another preferred embodiment of the preparation of the aqueous polyurethane dispersion, components Ia) to Id) and IIa) to IIb) are used in the following amounts, wherein the sum of the respective amounts is always 100 wt %:
  5 wt % to 35 wt % of component Ia),
  60 wt % to 90 wt % of component Ib),
  0.5 wt % to 15 wt % of components Ic) and IIa),
  0.1 wt % to 15 wt % of components Id) and IIb), wherein 0.2 wt % to 4 wt % of the anionic hydrophilic agent or potential anionic hydrophilic agent from Id) and/or IIb) is used, based on the total weight of components Ia) to Id) and IIa) to IIb).

In a further preferred embodiment of the preparation of the aqueous polyurethane dispersion, components Ia) to Id) and IIa) to IIb) are used in the following amounts, wherein the sum of the respective amounts is always 100 wt %:
  10 wt % to 30 wt % of component Ia),
  65 wt % to 85 wt % of component Ib),
  0.5 wt % to 14 wt % of components Ic) and IIa),
  0.1 wt % to 13.5 wt % of components Id) and IIb), wherein 0.5 wt % to 3.0 wt % of the anionic hydrophilic agent or potential anionic hydrophilic agent from Id) and/or IIb) is used, based on the total weight of components Ia) to Id) and IIa) to IIb).

In step I), the ratio of the isocyanate groups of the polyisocyanate of component Ia) to the isocyanate-reactive groups such as amino, hydroxyl or thiol groups in components Ib)-Id) is from 1.05 to 3.5, preferably 1.2 to 3.0, and most preferably from 1.3 to 2.5.

The polyisocyanate of component Ia) in step I) is preferably one or more of the following: a polyisocyanate having an isocyanate functionality of 2 and a polyisocyanate containing more than two NCO groups per molecule.

The polyisocyanate having an isocyanate functionality of 2 is preferably one or more of the following: 1,4-butylene diisocyanate, 1,6-hexylene diisocyanate (HDI), isophorone diisocyanate (IPDI), 2,2,4-trimethyl-hexamethylene diisocyanate, 2,4,4-trimethyl-hexamethylene diisocyanate, isomeric bis(4,4'-isocyanatocyclohexyl)methanes, a mixture of isomeric bis(4,4'-isocyanatocyclohexyl)methanes in any isomer contents, 1,4-cyclohexylene diisocyanate, 1,4-phenylene diisocyanate, 2,4-toluylene diisocyanate, 2,6-toluylene diisocyanate, 1,5-naphthylene diisocyanate, diphenylmethane-2,2'-diisocyanate, diphenylmethane-2,4'-diisocyanate, diphenylmethane-4,4'-diisocyanate, 1,3-bis(2-isocyanatopropan-2-yl)benzene, 1,4-bis(2-isocyanatopropan-2-yl)-benzene (TMXDI), 1,3-bis(isocyanatemethyl)benzene (XDI) and alkyl 2,6-diisocyanatohexanoate containing C1-C8 alkyl (lysine diisocyanate), most preferably one or more of the following: 1,6-hexylene diisocyanate (HDI), isophorone diisocyanate (IPDI), isomeric bis(4,4'-isocyanatecyclohexyl)methanes and a mixture of isomeric bis(4,4'-isocyanatocyclohexyl)methanes.

The polyisocyanate having an isocyanate functionality of 2 may also be derivatives of the above polyisocyanate having uretdione, isocyanurate, carbamate, allophanate, biuret, iminooxadiazinedione and/or oxadiazinetrione structure. The derivatives have two or more free isocyanate groups.

The polyisocyanate containing more than two NCO groups per molecule is preferably one or more of the following: 4-isocyanatomethyloctane 1,8-diisocyanate (decane triisocyanate) and triphenyl methane 4,4',4"-triisocyanate.

The polymer polyol of component Ib) in step I) may be those conventionally used in the preparation of aqueous polyurethane dispersions, preferably one or more of the following: polyester polyol, polyacrylate polyol, polyurethane polyol, polycarbonate polyol, polyether polyol, polyester polyacrylate polyol, polyurethane polyacrylate polyol, polyurethane polyester polyol, polyurethane polyether polyol, polyurethane polycarbonate polyol and polyester polycarbonate polyol.

The polyester polyol is preferably a polycondensate of a diol and optionally a triol and a tetraol with a dicarboxylic acid and optionally a tricarboxylic acid and a tetracarboxylic acid or a hydroxycarboxylic acid or a lactone. When the average functionality of the diol and optionally the triol and tetraol is more than 2, it is also possible to use a monocarboxylic acid, preferably benzoic acid and/or heptanoic acid, for polycondensation to synthesize the polyester polyol.

The diol is preferably one or more of the following: ethylene glycol, butylene glycol, diethylene glycol, triethylene glycol, polyalkylene glycol such as polyethylene glycol, 1,2-propanediol, 1,3-propanediol, 1,3-butanediol, 1,4-butanediol, 1,6-hexanediol and isomers thereof, neopentyl glycol and neopentyl glycol hydroxypivalate, most preferably one or more of the following: 1,6-hexanediol and isomers thereof, neopentyl glycol, and neopentyl glycol hydroxypivalate.

The triol and tetraol are preferably one or more of the following: trimethylolpropane, glycerol, erythritol, pentaerythritol, trimethylolbenzene, and trishydroxyethyl isocyanurate.

The dicarboxylic acid is preferably one or more of the following: phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid and 2,2-dimethylsuccinic acid. It is also possible to use the corresponding anhydride as an acid source of the dicarboxylic acid.

The lactone is preferably one or more of the following: caprolactone, caprolactone homologues, butyrolactone and butyrolactone homologues, most preferably caprolactone.

The number-average molecular weight of the polycarbonate polyol is preferably 400 g/mol to 8000 g/mol, most preferably 600 g/mol to 3000 g/mol.

The polycarbonate polyol preferably has a linear structure, and is most preferably a polycarbonate diol.

The polycarbonate diol preferably comprises 40 wt % to 100 wt % of hexanediol. The hexanediol is preferably 1,6-hexanediol and/or a hexanediol derivative. The hexanediol derivative is preferably based on hexanediol and contains an ester or ether group besides the terminal hydroxyl groups, and it can be obtained by the reaction of hexanediol with excess caprolactone or by etherification of hexanediol itself to form dihexanediol or trihexanediol. The polyether polyol is preferably one or more of the following: polytetramethylene glycol polyether and the addition products of styrene oxide, ethylene oxide, propylene oxide, butylene oxide and/or epoxy chloropropane on a di- or polyfunctional starter molecule.

The polytetramethylene glycol polyether is preferably obtained by cationic ring-opening polymerization of tetrahydrofuran.

The starter molecule is preferably one or more of the following: water, butyl diglycol, glycerol, diethylene glycol, trimethylolpropane, propylene glycol, sorbitol, ethylenediamine, ethylene glycol, triethanolamine and 1,4-butanediol.

The polymer polyol of component Ib) most preferably comprises polycarbonate polyol and polybutylene glycol polyol. The amount of the polycarbonate polyol and the polybutylene glycol polyol is preferably at least 50 wt %, further preferably 60 wt %, most preferably at least 70 wt %, based on the total weight of the polymer polyol.

The amount of the polycarbonate polyol is preferably 20 wt % to 80 wt %, further preferably 25 wt % to 70 wt %, most preferably 30 wt % to 65 wt %, based on the total weight of the polycarbonate polyol and the polybutylene glycol polyol.

The amount of the polybutylene glycol polyol is preferably 20 wt % to 80 wt %, further preferably 30 wt % to 75 wt %, most preferably 35 wt % to 70 wt %, based on the total weight of the polycarbonate polyol and the polybutylene glycol polyol.

The hydroxy-functional compound of component Ic) is preferably one or more of the following: a polyol having up to 20 carbon atoms, an ester diol, and a monofunctional or isocyanate-reactive hydroxy-functional compound.

The polyol having up to 20 carbon atoms is preferably one or more of the following: ethylene glycol, diethylene glycol, triethylene glycol, 1,2-propanediol, 1,3-propanediol, 1,4-butanediol, 1,3-butanediol, cyclohexanediol, 1,4-cyclohexanedimethanol, 1,6-hexanediol, neopentyl glycol, hydroquinone dihydroxyethyl ether, bisphenol A (2,2-bis(4-hydroxyphenyl)propane), hydrogenated bisphenol A (2,2-bis (4-hydroxycyclohexyl)propane), trimethylolpropane, glycerol and pentaerythritol.

The ester diol is preferably one or more of the following: α-hydroxybutyl-ε-hydroxycaproate, ω-hydroxyhexyl-γ-hydroxybutyrate, β-hydroxyethyl adipate, and β-hydroxyethyl terephthalate.

The monofunctional or isocyanate-reactive hydroxy-functional compound is preferably one or more of the following: ethanol, n-butanol, ethylene glycol monobutyl ether, diethylene glycol monomethyl ether, ethylene glycol monobutyl ether, diethylene glycol monobutyl ether, propylene glycol monomethyl ether, dipropylene glycol monomethyl ether, tripropylene glycol monomethyl ether, dipropylene glycol monopropyl ether, propylene glycol monobutyl ether, dipropylene glycol monobutyl ether, tripropylene glycol monobutyl ether, 2-ethylhexanol, 1-octanol, 1-dodecanol, 1-hexadecanol, 1,6-hexanediol, 1,4-butanediol, neopentyl glycol and trimethylolpropane, most preferably one or more of the following: 1,6-hexanediol, 1,4-butanediol, neopentyl glycol and trimethylolpropane.

The isocyanate-reactive anionic hydrophilic agent or potential anionic hydrophilic agent of component Id) is preferably a compound containing at least one isocyanate-reactive group such as hydroxyl, and at least one functional group such as $-COO^-M^+$, $-SO^{3-}M^+$, $-PO(O^-M^+)_2$, wherein $M^+$ is preferably one or more of the following: a metal cation, $H^+$, $NH^{4+}$ and $NHR^{3+}$, and R is preferably one or more of the following: $C_1$-$C_{12}$ alkyl, $C_5$-$C_6$ cycloalkyl and $C_2$-$C_4$ hydroxyalkyl. The above functional groups enter a pH-dependent dissociation equilibrium upon interaction with an aqueous medium and can thus carry a negative or neutral charge.

The isocyanate-reactive anionic hydrophilic agent or potential anionic hydrophilic agent of component Id) is further preferably one or more of the following: monohydroxycarboxylic acid, dihydroxycarboxylic acid, monohydroxysulfonic acid, dihydroxysulfonic acid, monohydroxylphosphonic acid, dihydroxyphosphonic acid, and salts thereof, most preferably one or more of the following: those containing a carboxylate group, a carboxylic acid group, and a sulfonate group.

The amino-functional compound of component IIa) is preferably one or more of the following: 1,2-ethylenediamine, 1,4-diaminobutane and isophoronediamine.

The isocyanate-reactive anionic hydrophilic agent or potential anionic hydrophilic agent of component IId) is preferably a compound containing at least one isocyanate-reactive group such as hydroxyl, and at least one functional group such as —COO⁻M⁺, —SO³⁻M⁺, —PO(O⁻M⁺)₂, wherein M⁺ is preferably one or more of the following: a metal cation, H⁺, NH⁴⁺ and NHR³⁺, and R is preferably one or more of the following: $C_1$-$C_{12}$ alkyl, $C_5$-$C_6$ cycloalkyl and $C_2$-$C_4$ hydroxyalkyl. The above functional groups enter a pH-dependent dissociation equilibrium upon interaction with an aqueous medium and can thus carry a negative or neutral charge.

The aqueous polyurethane dispersion can be prepared by a prepolymer mixing method, an acetone method or a melt dispersion method, preferably an acetone method.

In the acetone method, all or part of Ia)-Id) are usually first charged to prepare an isocyanate-functional prepolymer which is optionally diluted with a water-miscible solvent inert to the isocyanate groups, and heated to 50° C. to 120° C.

The solvent may be a conventional keto-functional aliphatic solvent such as acetone, 2-butanone. The solvent may be added only at the beginning of the preparation, or a part may be added during the preparation as needed.

The solvent may also be one or more of the following: xylene, toluene, cyclohexane, butyl acetate, methoxypropyl acetate, N-methylpyrrolidone, N-ethylpyrrolidone, and a solvent containing an ether or ester unit.

Any Ia)-Id) component that is not added at the beginning of the reaction is then metered in.

In the preparation of the isocyanate-functional prepolymer from components Ia) to Id), the molar ratio of isocyanate groups to isocyanate-reactive groups is from 1.05 to 3.5, preferably 1.2 to 3.0, and most preferably 1.3 to 2.5.

The components Ia) to Id) are partially or completely converted to the isocyanate-functional prepolymer, preferably completely converted.

The isocyanate-functional prepolymer obtained in step I) may be in a solid state or in a liquid state.

If the isocyanate-functional prepolymer obtained has not been dissolved or only partially dissolved, the prepolymer is further dissolved by means of an aliphatic ketone such as acetone or 2-butanone.

In step II), the NH₂- and/or NH-functional component is partially or completely reacted with the residual isocyanate groups of the isocyanate-functional prepolymer. Preferably, chain growth or termination is carried out prior to dispersion into water.

For chain termination, the amino-functional compound of component IIa) is generally used, which is preferably one or more of the following: methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine or suitable substituted derivatives thereof, an amidoamine made of a diprimary amine and a monocarboxylic acid, a monoketone oxime of a diprimary amine, and a primary/tertiary amine.

Component IIa) and component IIb) may optionally be used alone or in combination in the form of water dilution or solvent dilution, and added in any desired order.

Polycarbodiimide

The term "carbodiimide group" conforms to the —N═C═N— structure.

The polycarbodiimide according to the present application may be a dispersion, a solution, or a solid or a liquid.

The polycarbodiimide has a solid component in an amount of preferably 0.01 wt % to 10 wt %, most preferably 0.1 wt % to 1.5 wt %, based on the total weight of solid components of the adhesive.

The polycarbodiimide has a weight-average molecular weight of preferably 500 to 100,000, further preferably 1,000 to 100,000, and most preferably 2,000 to 5,000.

The carbodiimide group functionality of the polycarbodiimide is preferably 2 to 50, most preferably 3 to 6.

The polycarbodiimide preferably comprises the structure of formula I:

$$-\!\!+\!\!N\!=\!\!C\!=\!\!N\!-\!\!R\!\!+\!\!_n\!\!-\quad\quad I$$

wherein n is preferably an integer of 2 or more, further preferably 2 to 50, most preferably 3 to 6; and R is preferably one or more of the following: an aliphatic organic group, an alicyclic organic group and an aromatic organic group containing C and H atoms.

The polycarbodiimide can be synthesized by a generally known method. For example, an organic diisocyanate is subjected to decarboxylation condensation by using an organic phosphorus compound or an organometallic compound as a catalyst in the absence of a solvent or in an inert solvent at a temperature of about 70° C. or higher.

The organic diisocyanate used for the preparation of the polycarbodiimide is preferably one or more of the following: an aromatic diisocyanate, an aliphatic diisocyanate, and an alicyclic diisocyanate, most preferably one or more of the following: 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-toluylene diisocyanate, 2,6-toluylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 3,3',5,5'-tetraisopropyldiphenyl-4,4'-diisocyanate and 1,3,5-triisopropylbenzene-2,4-diisocyanate.

The polycarbodiimide is most preferably Desmodur® XP2802.

Carbodiimide Having a Carbodiimide Group Functionality of 1

The term "average carbodiimide group functionality" refers to the mean value of the functionalities of one or more polycarbodiimides and optionally one or more carbodiimides having a carbodiimide group functionality of 1.

The carbodiimide having a carbodiimide group functionality of 1 according to the present application may be a dispersion, a solution, or a solid or a liquid.

The adhesive preferably further comprises at least one carbodiimide having a carbodiimide group functionality of 1.

The carbodiimide having a carbodiimide group functionality of 1 preferably has a carbodiimide group content of 2 mmol/g to 10 mmol/g.

The carbodiimide having a carbodiimide group functionality of 1 preferably has a molecular weight of 100 to 450.

The carbodiimide having a carbodiimide group functionality of 1 preferably has a solid component in an amount of 0.1 wt % to 0.5 wt %, based on the total weight of solid components of the adhesive.

The polycarbodiimide and the carbodiimide having a carbodiimide group functionality of 1 preferably have an average carbodiimide group functionality of 1.1 to 50.

The carbodiimide having a carbodiimide group functionality of 1 preferably conforms to the general formula II:

$$R\!-\!N\!=\!C\!=\!N\!-\!R'\quad\quad II$$

wherein R and R' are each independently preferably one or more of the following: an aliphatic organic group, an alicyclic organic group and an aromatic organic group containing C and H atoms, most preferably one or more of the following: dicyclohexylcarbodiimide, diisopropylcarbodiimide, diphenylcarbodiimide, bis(methylphenyl)carbodiimide, bis(methoxyphenyl)carbodiimide, bis(nitrophenyl)carbodiimide, bis(dimethylphenyl)carbodiimide, bis(diisopropylphenyl)carbodiimide, bis(di-tert-butylphenyl)carbodiimide, N-ethyl-N'-(3-dimethylaminopropyl)carbodiimide, bis(triphenylsilyl)carbodiimide and cyclocarbodiimide.

The carbodiimide having a carbodiimide group functionality of 1 is most preferably one or more of the following: N,N'-diisopropylcarbodiimide and dicyclohexylcarbodiimide.

Surface Passivated Polyisocyanate

The surface passivated polyisocyanate according to the present application may be a dispersion or a solid.

The surface passivated polyisocyanate has a solid component in an amount of preferably 0.01 wt % to 30 wt %, most preferably 0.3 wt % to 30 wt %, based on the total weight of solid components of the adhesive.

The surface passivated polyisocyanate has a glass transition temperature of preferably above 30° C., most preferably 40° C. to 100° C.

The surface passivated polyisocyanate preferably has a particle diameter d50 of 500 nm to 500 µm, further preferably 1 µm to 500 µm, and most preferably 1 µm to 50 µm.

The isocyanate functionality of the surface passivated polyisocyanate is preferably 2 to 100, further preferably 3 to 100, and most preferably 3 to 6.

The reaction or tackifying temperature of the surface passivated polyisocyanate is preferably 30° C. to 180° C., most preferably 40° C. to 150° C.

The term "reaction or tackifying temperature" refers to the temperature at which the isocyanate surface passivation layer dissolves or otherwise breaks.

The term "passivating agent" is an agent capable of reacting with a solid polyisocyanate to obtain a stabilized surface passivated polyisocyanate.

The passivating agent is preferably one or more of the following: a primary aliphatic amine, a secondary aliphatic amine, a diamine or a polyamine, a hydrazine derivative, amidine and guanidine, most preferably one or more of the following: ethanediamine, 1,3-propanediamine, diethylenetriamine, triethylenetetramine, 2,5-dimethylpiperazine, 3,3'-dimethyl-4,4'-diamino-dicyclohexylmethane, methylnonanediamine, isophoronediamine, 4,4'-diaminodicyclohexylmethane, diaminopolypropyleneether, triaminopolypropyleneether, a polyamidoamine, a monoamine, a diamine and a polyamine.

The surface passivated polyisocyanate is preferably one or more of the following: surface passivated alicyclic polyisocyanates and derivatives of surface passivated alicyclic polyisocyanates having uretdione, isocyanurate, carbamate, allophanate, biuret, imino-oxadiazinedione and/or oxadiazinetrione structure, further preferably one or more of the following: surface passivated isophorone diisocyanate trimer and surface passivated toluene diisocyanate dimer, most preferably surface passivated isophorone diisocyanate trimer.

Method for Preparing an Adhesive

The method for preparing an adhesive comprises the step of mixing the components of the adhesive provided according to the present invention to obtain the adhesive.

Method for Producing a Bonded Product

Preferably, the method further comprise a step iv between step ii and step iii:
  iv. irradiating the substrate surface treated in step ii by means of actinic radiation. The method for producing a bonded product preferably comprises the following steps:
  i. applying the adhesive provided according to the present invention to at least one surface of a substrate;
  ii. heating and drying the substrate surface to which the adhesive is applied;
  iv. irradiating the substrate surface treated in step ii by means of actinic radiation; and
  iii. contacting the substrate surface treated in step iv with a surface of the substrate itself or an additional substrate to obtain the bonded product.

The substrate is preferably one or more of the following: wood, plastic, metal, glass, textile, alloy, fabric, artificial leather, paper, cardboard, EVA, rubber, dermis, glass fiber, ethylene vinyl acetate copolymer, polyolefin, thermoplastic polyurethane, polyurethane foam, polymer fiber and graphite fiber, most preferably one or more of the following: EVA, rubber, dermis, artificial leather, ethylene vinyl acetate copolymer, polyolefin, thermoplastic polyurethane and polyurethane foam.

Said "applying" may be applying the adhesive to the entire surface of the substrate or only to one or more portions of the substrate surface.

Said "applying" may be brushing, dipping, spraying, roller coating, knife coating, flow coating, casting, printing or transfer printing, preferably brushing, dipping or spraying.

Said "heating and drying the substrate surface to which the adhesive is applied" may refer to only heating and drying the substrate surface, or heating and drying the partial or entire substrate including the substrate surface to which the adhesive is applied.

Said "heating and drying" can remove a volatile component. The volatile component can be water.

Said "heating and drying" is preferably one or more of the following: infrared heat radiation, near-infrared heat radiation, microwaves, and use of a convection oven or a spray dryer at an elevated temperature.

The heating temperature is as high as possible, but should not be above the temperature limit at which the substrate is subject to deformation or other damages in any uncontrolled manner.

The irradiation by means of actinic radiation is preferably carried out when the surface temperature of the substrate treated in step ii is not lower than 35° C., most preferably immediately after the treatment in step ii.

Said "irradiating the substrate surface treated in step ii by means of actinic radiation" may refer to only irradiating the substrate surface, or irradiating the partial or entire substrate including the substrate surface.

The actinic radiation crystallizes and cures the adhesive.

The actinic radiation is preferably UV radiation, solar radiation, radiation with an inert gas or an oxygen-depleted gas in the absence of oxygen or radiation with a radiation-transparent medium covering the site to be irradiated, most preferably UV radiation or solar radiation.

The inert gas is preferably nitrogen or carbon dioxide. The radiation-transparent medium is preferably a synthetic film, glass or a liquid such as water.

In the UV radiation or solar radiation, it is possible to use medium or high pressure mercury vapor lamps, optionally doped with other elements such as gallium or iron to modify the mercury vapor, or use laser, pulsed lamps, halogen lamps or excimer radiators. The actinic radiation is most preferably UV radiation. In the UV radiation, it is most preferred to use fixed mercury radiation.

When the substrate has a three-dimensional surface of a complicated shape, it is preferred to use a plurality of radiation devices for radiation, which are reasonably arranged to uniformly irradiate the surface.

The wavelength of the actinic radiation is preferably 200 nm to 750 nm.

The dose of the actinic radiation is preferably no less than 80 mJ/cm$^2$, further preferably 80 mJ/cm$^2$ to 5000 mJ/cm$^2$, more preferably 200 mJ/cm$^2$ to 2000 mJ/cm$^2$, and most preferably 1250 mJ/cm$^2$ to 1950 mJ/cm$^2$.

Within the above range, the radiation dose of actinic radiation is as high as possible, but should not be above the radiation dose limit at which the substrate is subject to deformation or other damages in any uncontrolled manner.

Said "contacting" is carried out preferably before the temperature of the substrate surface is lower than the temperature at which the adhesive is bondable, further preferably before the temperature of the substrate surface is not lower than 60° C.

The substrate surface treated in step iv is contacted with the substrate itself or an additional substrate preferably within one hour, further preferably within 30 minutes, more preferably within 10 minutes, and most preferably within 5 minutes to obtain the bonded product.

The additional substrate can be any substrate that needs to be bonded.

The additional substrate may be the same as or different from the substrate.

Like the substrate, the additional substrate is preferably coated, heated and treated by means of actinic radiation.

Preferably, the additional substrate is not treated with a primer, high energy radiation or ozone prior to contact with the substrate surface.

The high energy radiation can be ionizing radiation, in particular plasma.

After contacting the substrate surface treated in step ii or treated in step iv with the substrate itself or the additional substrate, a further heat treatment may be performed.

After contacting the substrate surface treated in step ii or treated in step iv with the substrate itself or the additional substrate, a further cooling treatment may be performed to lower the temperature of the bonded product to room temperature.

The method of introducing heat is preferably one or more of the following: use of a convection oven or a spray dryer at an elevated temperature, infrared heat radiation, near-infrared heat radiation, microwaves, and heat transfer by means of an object contacted with the substrate coated with the adhesive according to the present invention.

Preferably, it is not necessary to introduce heat to the substrate surface before contacting the substrate surface treated in step ii or treated in step iv with the substrate itself or the additional substrate.

Bonded Product

The bonded product is preferably a shoe.

DESCRIPTION OF FIGURES

The invention will be indicated and explained in more detail below with reference to the drawings, in which.

EXAMPLES

All technical and scientific terms used herein have the same meaning as commonly understood by those skilled in the art to which the present invention belongs, unless otherwise defined. When the definition of a term in the present description conflicts with the meaning as commonly understood by those skilled in the art to which the present invention belongs, the definition described herein shall apply.

All numerical values expressing amount of ingredients, reaction conditions and the like which are used in the description and claims are to be understood as being modified by the term "about", unless otherwise specified. Accordingly, unless indicated to the contrary, the numerical values and parameters described herein are approximate values which can be varied according to the desired performance obtained as required.

The grammatical articles "one", "a", "an", and "the", as used in this specification, are intended to include "at least one" or "one or more", unless otherwise specified. By way of example, "a component" means one or more components, and thus, possibly, more than one component is contemplated and may be employed or used in an implementation of the described embodiments.

The term "and/or" used herein refers to one or all of the elements mentioned.

The terms "containing", "including" and "comprising" used herein cover both the case that there are only the elements mentioned and the case that there are also other elements unmentioned in addition to the elements mentioned.

All percentages in the present invention refer to weight percentage, unless otherwise specified.

The analysis and measurement in the present invention are carried out at a temperature of 23±2° C. and a humidity of 50±5%, unless otherwise specified.

The solid content of the dispersion is measured according to DIN-EN ISO 3251 using a HS153 moisture analyzer from Mettler Toledo.

The isocyanate group (NCO) content is determined by volume according to DIN-EN ISO 11909 and the measured data includes both free and potentially free NCO contents.

The carbodiimide group functionality of a carbodiimide refers to the number of carbodiimide groups contained in a single carbodiimide molecule.

The carbodiimide group functionality of a polycarbodiimide refers to the average number of carbodiimide groups contained in a single polycarbodiimide molecule.

The average carbodiimide group functionality can be obtained by calculation. For example: when the adhesive contains 0.13 g of N,N'-diisopropylcarbodiimide (DIC having a molecular weight of 126 and a functionality of 1) and 1 g of Desmodur XP 2802 (having a solid content of 40 wt %, a number-average molecular weight of 1779 and an average functionality of 4.5), the average carbodiimide group functionality is calculated as follows:

$$(0.13/126*1+1*0.4/1779*4.5)/(0.13/126+1*0.4/1779)=1.63$$

The acid value is measured according to DIN EN ISO 211.

The viscosity is measured according to DIN 53019 using a Brookfield DV-II+Pro. Rotational Viscometer at 23° C.

The glass transition temperature (Tg) is measured by differential scanning calorimetry using an Auto Q 20 type DSC from TA Company at a heating rate of 10° C./min.

The melting point ($T_m$) is measured according to DIN 65467 by DSC at a heating rate of 20 K/min.

The particle diameter d50 is determined by laser spectroscopy (measured by a Zatasizer Nano ZS 3600 laser particle diameter analyzer from Malvern Instruments) after dilution with deionized water.

The hydroxyl value is determined in accordance with ASTM D4274.

The number-average molecular weight and the weight-average molecular weight are determined by gel permeation chromatography using tetrahydrofuran as the mobile phase and control polystyrene standards at 23° C.

Raw Materials and Reagents

DCC: dicyclohexylcarbodiimide having a melting point of 37.42° C., a carbodiimide group content of 4.9 mmol/g, a molecular weight of 206, and a carbodiimide group functionality of 1.

DIC: N,N'-diisopropylcarbodiimide having a carbodiimide group content of 7.9 mmol/g, a molecular weight of 126, and a carbodiimide group functionality of 1.

Desmodur® XP 2802: hydrophilically modified polycarbodiimide having a solid content of 40 wt %, a melting point of the solid component of 23.16° C., a carbodiimide group content of 1 mmol/g, a number-average molecular weight of 1779, a weight-average molecular weight of 3258 and a carbodiimide group functionality of 4.5, purchased from Covestro AG.

Desmodur® Z 2589: isophorone diisocyanate (IPDI) trimer having a solid content of 100 wt %, a glass transition temperature of 67.75° C., a melting point of the solid component of higher than 200° C., an isocyanate functionality of no less than 3, a particle diameter d50 of about 1.5 μm and a reaction or tackifying temperature of 70° C.-120° C., purchased from Covestro AG.

Dispercoll® BL XP 2514: toluene diisocyanate (TDI) dimer having a solid content of 40 wt %, a melting point of the solid component of higher than 155° C., an isocyanate functionality of 2, a particle diameter d50 of about 10 μm and a reaction or tackifying temperature of 60° C.-90° C., purchased from Covestro AG.

Polyester I: 1,4-butanediol polyadipate diol having a hydroxyl value of 50, purchased from Covestro AG.

Polyester II: polyester diol composed of 1,6-hexanediol, neopentyl glycol and adipic acid having a hydroxyl value of 66, purchased from Covestro AG.

LB25: an ethylene oxide/propylene oxide-based monofunctional polyether polyol having a number-average molecular weight of 2,250 g/mol and a hydroxyl value of 25, purchased from Covestro AG.

Desmodur® H: 1,6-hexamethylene diisocyanate, purchased from Covestro AG.

Desmodur® I: isophorone diisocyanate, purchased from Covestro AG.

DMPA: 2,2-dimethylolpropionic acid, purchased from Aldrich Chemicals.

AAS: sodium diaminosulfonate $NH_2-CH_2CH_2-NH-CH_2CH_2-SO_3Na$ having a concentration of 45% in water, purchased from Covestro AG.

L-lysine: 50% aqueous solution of L-lysine, purchased from Feihe Chemical, Xiamen.

Jeffamine® T403: polyetheramine, purchased from Huntsman.

Tamol® NN 4501: dispersant, purchased from BASF.

Emulvin® WA: emulsifier having a concentration of 15 wt %, purchased from LANXESS.

Borchigel® ALA: thickener having a concentration of 50 wt % in deionized water, purchased from OMG.

Rubber treatment agent: B powder (trichloroisocyanuric acid) dissolved in ethyl acetate at a concentration of 2 wt %.

Borchigel L75N: thickener, purchased from OMG.

Preparation of Aqueous Polyurethane Dispersions 1-3

Aqueous Polyurethane Dispersion 1 (PUD1)

607.5 g of polyester I and 57.4 g of polyester II were dehydrated at 110° C. and 15 mbar for 1 hour, and then 3.0 g of 1,4-butanediol was added and the mixture was cooled while stirring. 51.1 g of Desmodur® H was added at 60° C., followed by the addition of 33.8 g of Desmodur® I, and the mixture was stirred at 80° C. to 90° C. until an isocyanate content of 1.3% was reached. The reaction mixture was dissolved in 1050 g of acetone and cooled to 50° C. After adding a solution of 7.0 g of AAS, 0.9 g of dihydroxyethylamine and 2.7 g of L-lysine in 80 g of water to the reaction mixture solution and vigorously stirring for 30 minutes, 675 g of water was added to disperse the mixture, followed by distillation to separate off acetone to obtain the aqueous polyurethane dispersion 1 having an acid value of 0.93 mg KOH/g, a melting point of the solid component of the dispersion of 42.90° C., a melting enthalpy of 38.52 J/g, a solid content of 50.6 wt %, and an amount of the hydrophilic anionic groups of 4.8 meq/100 g of solid polyurethane.

Aqueous Polyurethane Dispersion 2 (PUD2)

607.5 g of polyester I and 57.4 g of polyester II were dehydrated at 110° C. and 15 mbar for 1 hour, and then 3.0 g of 1,4-butanediol was added and the mixture was cooled while stirring. at 60° C. 51.1 g of Desmodur® H was added, followed by the addition of 33.8 g of Desmodur® I, and the mixture was stirred at 80° C. to 90° C. until an isocyanate content of 1.3% was reached. The reaction mixture was dissolved in 1050 g of acetone and cooled to 50° C. After adding a solution of 7.0 g of AAS, 0.9 g of dihydroxyethylamine and 1.1 g of diethanolamine in 80 g of water to the reaction mixture solution and vigorously stirring for 30 minutes, 700 g of water was added to disperse the mixture, followed by distillation to separate off acetone to obtain the aqueous polyurethane dispersion 2 having an acid value of 0.39, a melting point of the solid component of the dispersion of 47.19° C., a melting enthalpy of 41.94 J/g, a solid content of 51.9 wt %, and an amount of the hydrophilic anionic groups of 4.8 meq/100 g of solid polyurethane.

Aqueous Polyurethane Dispersion 3 (PUD3)

607.5 g of polyester I, 57.4 g of polyester II and 7.6 g of LB 25 were dehydrated at 110° C. and 15 mbar for 1 hour, and then 1.4 g of 1,4-butanediol and 2.5 g of DMPA were added and the mixture was cooled while stirring. 51.1 g of Desmodur® H was added at 60° C., followed by the addition of 33.8 g of Desmodur® I, and the mixture was stirred at 80° C. to 90° C. until an isocyanate content of 1.3% was reached. The reaction mixture was dissolved in 1050 g of acetone and cooled to 50° C. After adding a solution of 7.0 g of AAS, 1.2 g of dihydroxyethylamine and 1.9 g of 2-(2-aminoethylamino)ethanol in 85 g of water to the reaction mixture solution and vigorously stirring for 30 minutes, 685 g of water was added to disperse the mixture, followed by distillation to separate off acetone to obtain the aqueous polyurethane dispersion 3 having an acid value of 1.05 mg KOH/g, a melting point of the solid component of the dispersion of 47.99° C., a melting enthalpy of 43.8 J/g, a solid content of 50.5 wt % and an amount of the hydrophilic anionic groups of 4.8 meq/100 g of solid polyurethane.

Preparation of Adhesives 110.19 g of deionized water and 2.58 g of Jeffamine® T403 were mixed and stirred at 600 rpm for 3 minutes. After adding 0.82 g of Tamol® NN 4501, stirring was continued for 3 minutes, and then 0.59 g of Emulvin WA was added and stirred for 3 minutes to obtain a mixture. The amount of shorter the total degumming time is, the worse the hydrolysis resistance of the coating formed by the adhesive is.

Table 1 lists the composition of the adhesives of the inventive Examples and the Comparative Examples and the total degumming time of the samples.

TABLE 1

Composition of the adhesives of the inventive Examples (Ex) and the Comparative Examples (CE) as well as the total degumming time of the samples

| Example | PUD1/g | PUD2/g | PUD3/g | DCC/g | DIC/g | Desmodur® XP 2802/g | Desmodur® Z 2589/g | Dispercoll® BL XP 2514/g | Average carbodi-imide group functionality of polycarbo-diimide and carbo-diimide | Total de-gumming time of the samples/hours |
|---|---|---|---|---|---|---|---|---|---|---|
| Ex 1  | 100 |     |     |      |      | 1   | 1  |   | 4.5  | 12-20 |
| Ex 2  | 100 |     |     |      | 0.13 | 1   | 1  |   | 1.63 | 4 |
| Ex 3  |     | 100 |     |      |      | 1   | 1  |   | 4.5  | 1.6 |
| Ex 4  |     | 100 |     |      | 0.13 | 1   | 1  |   | 1.63 | 1.3 |
| Ex 5  |     | 100 |     |      |      | 1   | 5  |   | 4.5  | 1.6 |
| Ex 6  |     | 100 |     |      |      | 1   | 10 |   | 4.5  | 3 |
| Ex 7  |     | 100 |     |      |      | 1   | 20 |   | 4.5  | 1.3 |
| Ex 8  |     |     | 100 |      |      | 0.5 |    | 3 | 4.5  | 4 |
| Ex 9  |     |     | 100 |      |      | 1   | 1  |   | 4.5  | 7.3 |
| Ex 10 |     |     | 100 |      |      | 1   |    | 1 | 4.5  | 3.2 |
| CE 1  | 100 |     |     |      |      |     |    |   | 0    | 0.4 |
| CE 2  | 100 |     |     |      |      | 1   |    |   | 4.5  | 0.5 |
| CE 3  | 100 |     |     |      |      |     | 1  |   | 0    | 0.6 |
| CE 4  | 100 |     |     | 1    |      |     | 1  |   | 1    | 0.5 |
| CE 5  | 100 |     |     | 2    |      | 1   | 1  |   | 1.08 | 0.4 |
| CE 6  |     | 100 |     |      |      | 1   |    |   | 4.5  | 0.6 |
| CE 7  |     | 100 |     |      |      |     | 1  |   | 0    | 1.1 |
| CE 8  |     |     | 100 |      |      |     |    | 3 | 0    | 0.2 |

Note:
the amount of each aqueous dispersion in the table refers to the aqueous weight.

Desmodur® Z 2589 as shown in Table 1 was divided into 7 portions, and Desmodur® Z 2589 was added to the mixture in portions at a stirring speed of 1000 rpm, followed by stirring for 20 minutes, and finally 14.07 g of Borchigel® ALA was added and stirring was continued for 30 minutes to obtain a mixture comprising surface passivated polyisocyanate.

Adhesives were obtained by mixing the components shown in Table 1, the prepared mixture comprising surface passivated polyisocyanate, and 0.5 g of Borchigel® L75N, and stirring at 600 rpm for 25 minutes.

Hydrolysis Resistance Test

Figure 1:
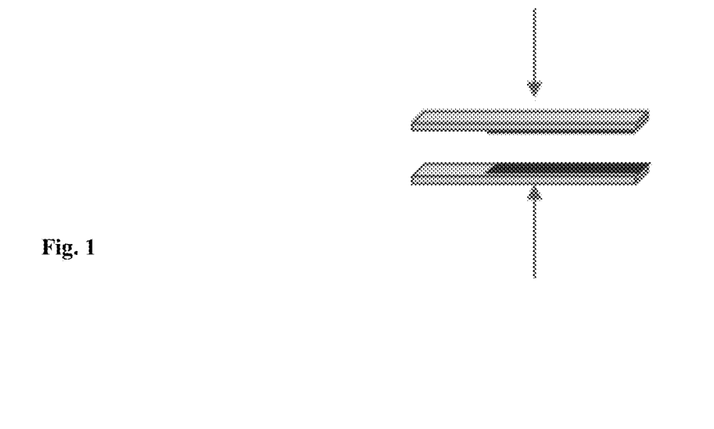
FIG. 1 is a schematic diagram of the bonding of a black rubber sample.

The black rubber (8 cm*2.54 cm) was mechanically ground and then the rubber treatment agent was applied. It was baked in an oven at 50° C. for 3 minutes, taken out and left at room temperature for 2 hours. The adhesive was applied to the pretreated black rubber using a brush, and dried and activated in an oven at 60° C. for 3 minutes. Immediately, two pieces of the black rubber were contacted for 10 seconds under a pressure of 4 bar, as shown in FIG. 1. It was then stored at room temperature (23±2° C., 50±5% RH) for 2 days to obtain a sample for test.

Figure 2:
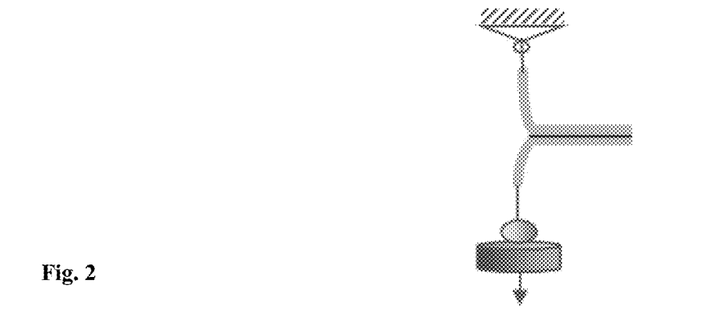
FIG. 2 is a schematic diagram of the hydrolysis resistance test.

1 kg of weight was loaded onto the sample which was then placed in a Hitachi box at a temperature of 70° C. and a relative humidity of 95%, as shown in FIG. 2. The time was recorded when two pieces of the black rubber of the sample were completely separated due to degumming. The When comparing Comparative Examples 1-8 with Examples 1-10, it can be seen that the samples bonded by using the adhesives of the present invention have a total degumming time of no less than 1.3 hours, which is longer than that of the samples bonded by using the adhesives of the Comparative Examples, indicating that the hydrolysis resistance of the coating formed by the adhesives of the present invention is better than that of the Comparative Examples.

When comparing Comparative Example 5 with Examples 1-2, it can be seen that the sample bonded by using the adhesive of Comparative Example 5 has a much shorter total degumming time than that of the samples bonded by using the adhesives of Examples 1-2, indicating that the hydrolysis resistance of the coating formed by the adhesives of the present invention is much better than that of the Comparative Examples, wherein the polycarbodiimide and the carbodiimide having a carbodiimide group functionality of 1 in Examples 1-2 have an average carbodiimide group functionality of no less than 1.1, and the polycarbodiimide and the carbodiimide having a carbodiimide group functionality of 1 in Comparative Example 5 have an average carbodiimide group functionality of less than 1.1.

When comparing Examples 1-2, 8-10 and 3-7, it can be seen that the samples bonded by using the adhesives of Examples 1-2 and 8-10 have a much longer total degumming time than that of the samples bonded by using the adhesives of Examples 3-7, indicating that the acid value of an aqueous polyurethane dispersion has a significant influence on the hydrolysis resistance of the coating formed by the adhesive, wherein the aqueous polyurethane dispersions contained in the adhesives of Examples 1-2 and 8-10 have an acid value of 0.5 mg KOH/g or more, and the aqueous polyurethane dispersions contained in the adhesives of Examples 3-7 have an acid value of less than 0.5 mg KOH/g.

When comparing Examples 9 and 10, it can be seen that the sample bonded by using the adhesive of Example 10 has a much shorter total degumming time than that of the sample bonded by using the adhesive of Example 9, indicating that the NCO functionality of surface passivated polyisocyanate significantly affects the hydrolysis resistance of the coating formed by the adhesive, wherein the surface passivated polyisocyanate contained in the adhesive of Example 10 has an NCO functionality of 2, and the surface passivated polyisocyanate contained in the adhesive of Example 9 has an NCO functionality of 3.

It is apparent to those skilled in the art that the present invention is not limited to the specific details described above, and may be embodied in other specific forms without departing from the spirit or essential characteristics of the present invention. The Examples are to be considered in all respects as illustrative but not restrictive, so that the scope of the present invention is defined by the claims rather than the foregoing description. Thus, any change, as long as it belongs to the meaning and range of equivalents of the claims, should be considered as part of this invention.

The invention claimed is:

1. An adhesive comprising:
   a. at least one aqueous polyurethane dispersion, wherein the aqueous polyurethane dispersion has an acid value of 0.5 mg KOH/g to 10 mg KOH/g, wherein the at least one aqueous polyurethane dispersion has a solid component in an amount of 70 wt % to 99.98 wt %, based on a total weight of solid components of the adhesive;
   b. at least one surface passivated polyisocyanate, wherein the at least one surface passivated polyisocyanate has a solid component in an amount of 0.01 wt % to 30 wt %, based on the total weight of solid components of the adhesive;
   c. at least one polycarbodiimide having a weight-average molecular weight of 500 to 100,000, wherein the at least one polycarbodiimide has a solid component in an amount of 0.01 wt % to 10 wt %, based on the total weight of solid components of the adhesive; and
   d. optionally a carbodiimide having a carbodiimide group functionality of 1,
   wherein the polycarbodiimide and the carbodiimide having a carbodiimide group functionality of 1 have an average carbodiimide group functionality of 1.1 to 50.

2. The adhesive according to claim 1, wherein the solid component of the aqueous polyurethane dispersion has a melting enthalpy of more than 3 J/g at 20 to 100° C., based on a first heating curve measured by DSC at a heating rate of 20 K/min according to DIN 65467.

3. The adhesive according to claim 1, wherein the polycarbodiimide has a weight-average molecular weight of 1,000 to 100,000.

4. The adhesive according to claim 1, wherein the polycarbodiimide has a carbodiimide group functionality of 2 to 50.

5. The adhesive according to claim 1, wherein the surface passivated polyisocyanate has a glass transition temperature of higher than 30° C.

6. The adhesive according to claim 1, wherein the surface passivated polyisocyanate has a particle diameter d50 of 500 nm to 500 μm.

7. The adhesive according to claim 1, wherein the surface passivated polyisocyanate has an isocyanate functionality of 2 to 100.

8. The adhesive according to claim 1, wherein the surface passivated polyisocyanate comprises a surface passivated alicyclic polyisocyanates or a derivative of a surface passivated alicyclic polyisocyanates having a uretdione, an isocyanurate, a carbamate, an allophanate, a biuret, an iminooxadiazinedione, an oxadiazinetrione, or a combination thereof.

9. A method for producing a bonded product comprising:
   i. applying the adhesive according to claim 1 to at least one surface portion of a substrate;
   ii. heating and drying the substrate surface portion to which the adhesive is applied; and
   iii. contacting the substrate surface portion treated in step ii with another surface portion of the substrate itself or an additional substrate to obtain the bonded product.

10. The method according to claim 9, further comprising:
   iv. irradiating the substrate surface treated in step ii by means of actinic radiation prior to step iii.

11. The method according to claim 9, wherein the substrate comprises: wood, plastic, metal, glass, textile, alloy, fabric, artificial leather, paper, cardboard, ethylene vinyl acetate (EVA), rubber, dermis, glass fiber, ethylene vinyl acetate copolymer, polyolefin, thermoplastic polyurethane, polyurethane foam, polymer fiber, graphite fiber, or a combination thereof.

12. A bonded product produced by the method according to claim 9.

13. The bonded product according to claim 12, wherein the bonded product is a shoe.

14. The adhesive according to claim 1, wherein the at least one surface passivated polyisocyanate has an isocyanate functionality of from 3 to 100.

* * * * *